US007405870B2

(12) United States Patent
Qiao et al.

(10) Patent No.: US 7,405,870 B2
(45) Date of Patent: Jul. 29, 2008

(54) METHOD AND APPARATUS FOR AMPLIFIED SPONTANEOUS EMISSION CORRECTED AUTOMATIC SIGNAL POWER CONTROL OF AN OPTICAL AMPLIFIER

(75) Inventors: Lijie Qiao, Ottawa (CA); Paul J. Vella, Ottawa (CA)

(73) Assignee: BTI Photonic Systems Inc., Ottawa, Ontario (CA)

( * ) Notice: Subject to any disclaimer, the term of this patent is extended or adjusted under 35 U.S.C. 154(b) by 0 days.

(21) Appl. No.: 11/645,161

(22) Filed: Dec. 26, 2006

(65) Prior Publication Data

US 2007/0297044 A1 Dec. 27, 2007

Related U.S. Application Data

(60) Provisional application No. 60/805,817, filed on Jun. 26, 2006.

(51) Int. Cl.
*H01S 3/00* (2006.01)
(52) U.S. Cl. .................................. 359/341.41
(58) Field of Classification Search ............. 359/341.41
See application file for complete search history.

(56) References Cited

U.S. PATENT DOCUMENTS

| 6,049,413 | A | * | 4/2000 | Taylor et al. ................. 359/337 |
| 6,198,571 | B1 | * | 3/2001 | Yang ........................... 359/337 |
| 6,337,764 | B1 | * | 1/2002 | Yoon et al. ............. 359/341.41 |
| 6,639,716 | B1 | * | 10/2003 | Tomofuji ............... 359/337.12 |
| 6,714,343 | B2 | * | 3/2004 | Goobar et al. ............... 359/337 |
| 7,019,894 | B1 | * | 3/2006 | Stentz et al. ........... 359/341.41 |
| 7,068,423 | B2 | * | 6/2006 | Vella et al. ............. 359/341.42 |
| 7,139,118 | B2 | * | 11/2006 | Griggs et al. ............. 359/337.1 |
| 2001/0040720 | A1 | * | 11/2001 | Gerrish et al. ............ 359/341.4 |
| 2001/0040721 | A1 | * | 11/2001 | Gerrish et al. ......... 359/341.41 |
| 2003/0117696 | A1 | * | 6/2003 | Goobar et al. ........... 359/337.2 |
| 2004/0051938 | A1 | * | 3/2004 | Chan et al. ................ 359/337.1 |
| 2005/0105170 | A1 | * | 5/2005 | Shukunami et al. .... 359/341.41 |
| 2005/0111078 | A1 | * | 5/2005 | Qiao et al. .................. 359/337 |

FOREIGN PATENT DOCUMENTS

EP 1085683 A1 * 3/2001

OTHER PUBLICATIONS

Shooshtari et al. Beam Propagation Method for Analysis of Er-doped integrated optics devices. Opt. Eng. 39(3) 735-737 (Mar. 2000).*
Agrawal, Govind. Fiber-Optic Communication Systems. John Wiley & Sons, Inc. 1997. pp. 364-365.*

* cited by examiner

*Primary Examiner*—Deandra M. Hughes

(57) ABSTRACT

An optical amplifier system and controller and a method for automatically controlling the usable signal power of an optical amplifier are provided. The method differentiates between the total optical power that includes the amplified spontaneous emission (ASE), and the useful amplified optical signal power at the output of the amplifier. The optical amplifier system comprises an optical amplifier, a first and a second photodetector operable to measure the power of the input and output signals of the optical amplifier and an amplification controller with a control input. The amplification controller is operable to compensate for the ASE power when operating in automatic signal power control mode.

22 Claims, 9 Drawing Sheets

METHOD AND APPARATUS FOR AMPLIFIED SPONTANEOUS EMISSION CORRECTED AUTOMATIC SIGNAL POWER CONTROL OF AN OPTICAL AMPLIFIER

RELATED APPLICATION

This application claims the benefit of prior U.S. provisional application No. 60/805,817 filed Jun. 26, 2006, hereby incorporated by reference in its entirety.

FIELD OF THE INVENTION

The invention pertains to the field of optical amplifiers, and more particularly to the field of automatic signal power control of optical amplifiers.

BACKGROUND OF THE INVENTION

For many applications, for example in optical pre-amplifiers, it is desirable to operate an optical amplifier in a mode of operation such that either the output optical power of the amplifier or the gain of the optical amplifier is maintained at a constant level. These modes of operation are referred to as constant output power mode and constant gain mode respectively.

The total optical output power of an amplifier consists of both amplified signal power and amplified spontaneous emission (ASE) power. Existing amplifiers rely on automatic power control (APC) to maintain the total optical power of the amplifier at a constant level. Therefore, existing APC implementations are unable to determine the usable optical signal power and optical network engineers are forced to allow additional margins in their optical power-budget design or operate the amplifier in automatic gain control (AGC) where an ASE correction is easier to implement.

SUMMARY OF THE INVENTION

According to one aspect of the present invention, there is provided a method comprising: measuring power of an input optical signal; determining a target usable signal power at the output of the amplifier; amplifying the input optical signal to produce an amplified optical signal comprising an amplified input optical signal and amplified spontaneous emission (ASE); determining an estimate of the ASE power in the amplified optical signal; and controlling the amplifying such that the amplified input optical signal has a power substantially equal to the target usable signal power.

According to another aspect of the present invention, there is provided an optical amplifier system with an optical input and an optical output and a control input comprising: an optical amplifier in a signal path between the optical input and the optical output, operable to amplify an input optical signal to produce an amplified optical signal comprising an amplified input optical signal and amplified spontaneous emission (ASE); a first photodetector operable to measure power of the input optical signal at the optical input; a second photodetector operable to measure power of the amplified optical signal at the optical output; an amplification controller functionally connected to the optical amplifier, the control input and the first and second photodetectors, operable to: determine a target usable signal power; determine an estimate of ASE power in the amplified optical signal; and control the optical amplifier such that the amplified input optical signal at the output of the amplifier has a power substantially equal to the target usable signal power.

According to still another aspect of the present invention, there is provided a method for controlling an optical amplifier comprising: determining target usable signal power; estimating ASE power in an amplified optical signal comprising an amplified input optical signal and ASE as a function of an input optical signal power and the target usable signal power; and controlling at least one control signal such that the amplified input optical signal at the output of the amplifier has a power substantially equal to the target usable signal power.

According to yet another aspect of the present invention, there is provided a computer readable medium having recorded thereon statements and instructions for execution by a computer to carry out the method for controlling an optical amplifier comprising: determining target usable signal power; estimating ASE power in an amplified optical signal comprising an amplified input optical signal and ASE as a function of an input optical signal power and the target usable signal power; and controlling at least one control signal such that the amplified input optical signal has a power substantially equal to the target usable signal power.

According to a further aspect of the present invention, there is provided a controller comprising: a first input operable to receive a measurement of power of an input optical signal of at least one optical amplifier operable to amplify the input optical signal to produce an amplified optical signal comprising an amplified input optical signal and amplified spontaneous emission (ASE); a second input operable to receive a measurement of power of the amplified optical signal of the at least one optical amplifier; control logic operable to: determine a target usable signal power; determine an estimate of ASE power in the amplified optical signal; and provide at least one control signal operable to adjust a gain of the at least one optical amplifier such that the amplified input optical signal has a power substantially equal to the target usable signal power; and at least one control signal output operable to output the at least one control signal.

Other aspects and features of the present invention will become apparent, to those ordinarily skilled in the art, upon review of the following description of the specific embodiments of the invention.

BRIEF DESCRIPTION OF THE DRAWINGS

Embodiments of the invention will now be described in greater detail with reference to the accompanying diagrams, in which.

DETAILED DESCRIPTION OF THE EMBODIMENTS OF THE INVENTION

A system designer who wishes to operate an optical amplifier with APC is generally interested in knowing the useful signal power, not the total power. Unfortunately, existing APC implementations fail to compensate for the ASE power. Because of this, existing APC solutions are of limited value to system designers.

Various methods and devices to perform amplified spontaneous emissions (ASE) corrected automatic signal power control (ASPC) in an optical amplifier are provided. The methods and devices for doing this make use of measured input and output power levels, and calculate the ASE power for a target output signal power level. A gain of the optical amplifier can then be automatically adjusted in order to keep the output signal power at the target output signal power level regardless of the presence of ASE. The type of optical amplifier that might be used is an implementation specific detail and might include doped fiber amplifiers, such as erbium doped fiber amplifiers, as well as semiconductor optical amplifiers.

The systems and devices described below have the advantage that they compensate for ASE when performing ASPC.

Figure 1:
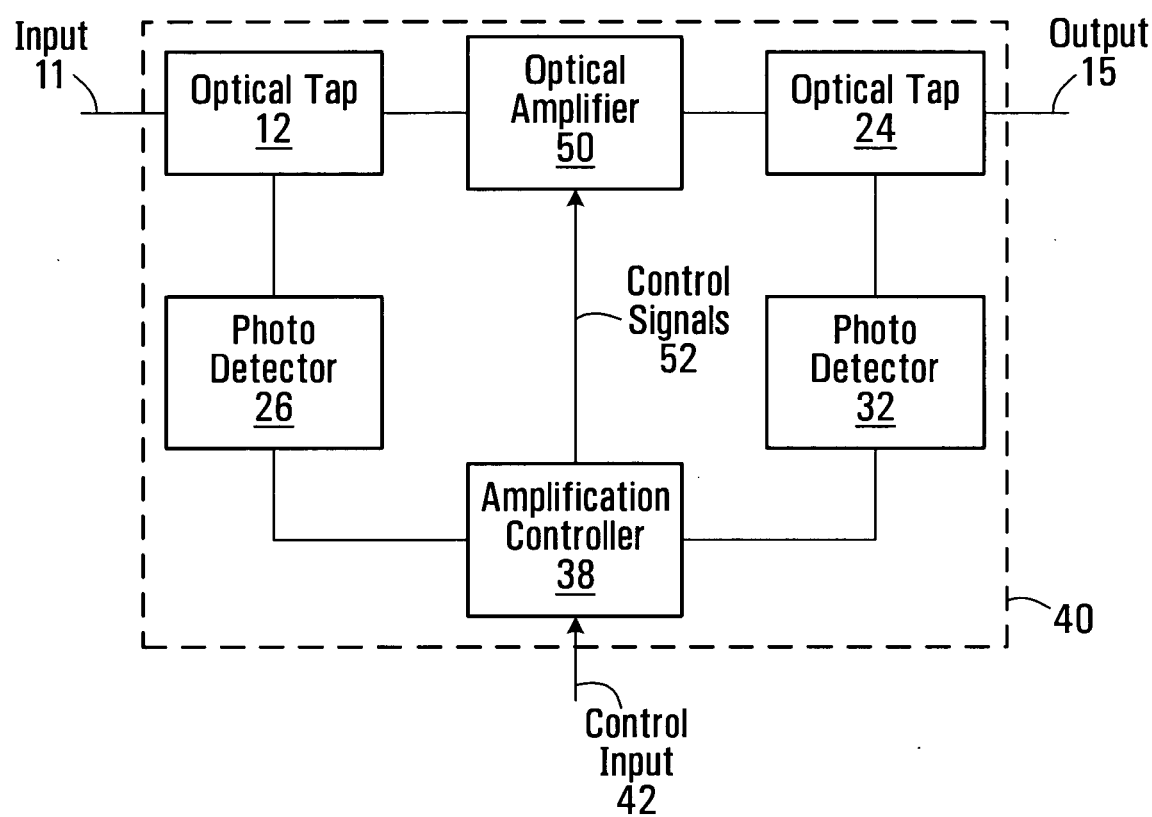
FIG. 1 is a block diagram of an optical amplification system in accordance with an embodiment of the invention.

FIG. 1 is a block diagram of an example of an optical amplifier system 40 in accordance with an embodiment of the invention in which optical amplification is controlled by an amplification controller 38 that compensates for amplified spontaneous emissions (ASE) while performing automatic signal power control (ASPC). The optical amplification system 40 has an input 11 and an output 15. The input 11 is connected to an input of a first optical tap 12. The first optical tap 12 has a first output and a second output; the first output is connected to a first input of an optical amplifier (OA) 50, while the second output is connected to a first photodetector (PD) 26. The first PD 26 receives an optical signal from the second output of tap 12, which is proportional to the optical power at the input 11 of the optical amplifier 40. The optical amplifier 50 has a second input that is functionally connected to an amplification controller 38 via control signals 52. The control signals 52 may comprise one or more signals. The optical amplifier has an output that is connected to the input of a second optical tap 24. The second optical tap 24 has a first output and a second output; the first output of the second optical tap 24 is connected to the output 15 of the optical amplifier system 40, while the second output of the second optical tap 24 is connected to the input of a second photodetector 32. The second PD 32 receives an optical signal from the second output of tap 24, which is proportional to the optical power at the output 15 of the optical amplifier 40. The outputs of the first and second photodetectors 26 and 32 are functionally connected to first and second inputs of the amplification controller 38, which also has a control input 42.

In some implementations, the amplification controller 38 might be implemented as an application specific integrated circuit (ASIC) or in a logic device such as a field programmable gate array (FPGA) or a programmable logic device (PLD). In general, an amplification controller might be implemented as hardware, software, firmware or combinations thereof, which are capable of implementing control logic.

While the first optical tap 12 and the first photodetector 16 are shown as separate components, they may be provided as a single component, for example a tap-type photodetector. The same is true of the second optical tap 24 and the second optical detector 32.

The optical amplifier 50 is any type of optical amplifier that generates ASE, for example a doped fiber amplifier, such as an erbium doped fiber amplifier, a Raman amplifier or a semiconductor optical amplifier.

In operation, an optical signal that is to be amplified is applied to the input 11 of optical amplifier system 40. The first optical tap 12 splits the input optical signal into a first signal and a second signal and passes the second signal to the first photodetector 26 and the first signal to the optical amplifier 50. The tap ratio of the first optical tap 12, which is the ratio between the first signal and the second signal, is an implementation specific detail. The first optical tap 12 might, for example, split the optical input signal such that substantially all of the optical input signal is passed to the first input of the optical amplifier 50, while very little of the optical input signal is passed to the first photodetector 26. The first photodetector 26 measures the second signal that is proportional to the input signal to the amplifier, and transmits the measurement information to the amplification controller 38. The optical amplifier 50 amplifies the first signal from the first optical tap 12 and also generates ASE power. The output from the optical amplifier 50, which comprises the amplified first signal and the ASE power, is then split by the second optical tap 24 into a third signal and a fourth signal. The second optical tap 24 passes the fourth signal to the second photodetector 32 and the third signal to the output 15 of the amplifier system 40. The second photodetector 32 measures the fourth signal that is proportional to the output optical power of the amplifier, and transmits the measurement information to the amplification controller 38. Like the tap ratio of the first optical tap 12, the tap ratio of the second optical tap 24 is an implementation specific detail. The second optical tap 24 might for example split the output of the optical amplifier 50 such that substantially all of the output of the optical amplifier 50 is passed to the output 15 of the optical amplifier system 40, while very little of the optical input signal is passed to the second photodetector 32. For example, in some embodiments, the tap ratios of the first optical tap 12 and the second optical tap 24 might both be 90:10.

The operation of the amplification controller 38 is setup through the control input 42. The control logic of the amplification controller 38 utilizes the measurement information from the first photodetector 26 and the second photodetector 32 to control the optical amplifier 50 via control signals 52. In some embodiments, the optical amplifier may be a dynamic gain-flattened amplifier with one or more variable optical attenuators, and the control signals 52 may comprise signals for controlling the attenuation of the one or more variable optical attenuators. Other examples of control signals include inputs for controlling laser diodes operating as EDFA pumps. In general, the control signals 52 may comprise any signals that adjust the output signal of the optical amplifier 50. As stated above, the output of the optical amplifier 50, and thus the output 15 of the optical amplifier system 40, comprises a desired output signal, comprising the amplified first signal, and an ASE component. Using operating characteristics of the optical amplifier 50, which can be determined during a calibration, the power of the ASE component of the output 15 is calculated and the gain of optical amplifier 50 is controlled such that the output 15 of the optical amplifier system 40 is maintained at a power level equal to the sum of a target output signal power and the calculated power of the ASE component; thereby carrying out ASE compensated ASPC.

In some implementations, the power of the ASE component of the output 15 is calculated as a function of the gain of the optical amplifier 50, wavelength and input signal power. The calibration process is an implementation specific detail and examples of calibration processes for specific embodiments will be given later.

In some implementations, the control input 42 is operable to interface with a user interface (UI) device, such as a computer with a graphical user interface (GUI) that allows a user to configure, monitor and control the optical amplifier system 40 with the amplification controller 38. A mouse pointer or a touch screen may be used to interact with the information that is displayed on the UI device, for example, turning the ASE compensated ASPC mode of the amplifier system 40 on or off and displaying the operating characteristics of the amplifier system 40, such as the signal wavelength $\lambda_s$, the effective gain, the true gain, the target usable signal power $S_t$, the measured input signal power $S_{in}$, the output power $P_{out}$, the ASE calibration constants, which are described below with reference to the methods shown in FIGS. 3, 4 and 5, and the calculated ASE power. In other embodiments the UI device may be a wireless handheld computer. More generally, the optical amplifier system 40 can be configured, monitored and controlled by any UI device with the capability to communicate with the amplification controller 38 via the control input 42 and the capability to allow a user to input data and to interact with the data that is displayed.

Figure 8:
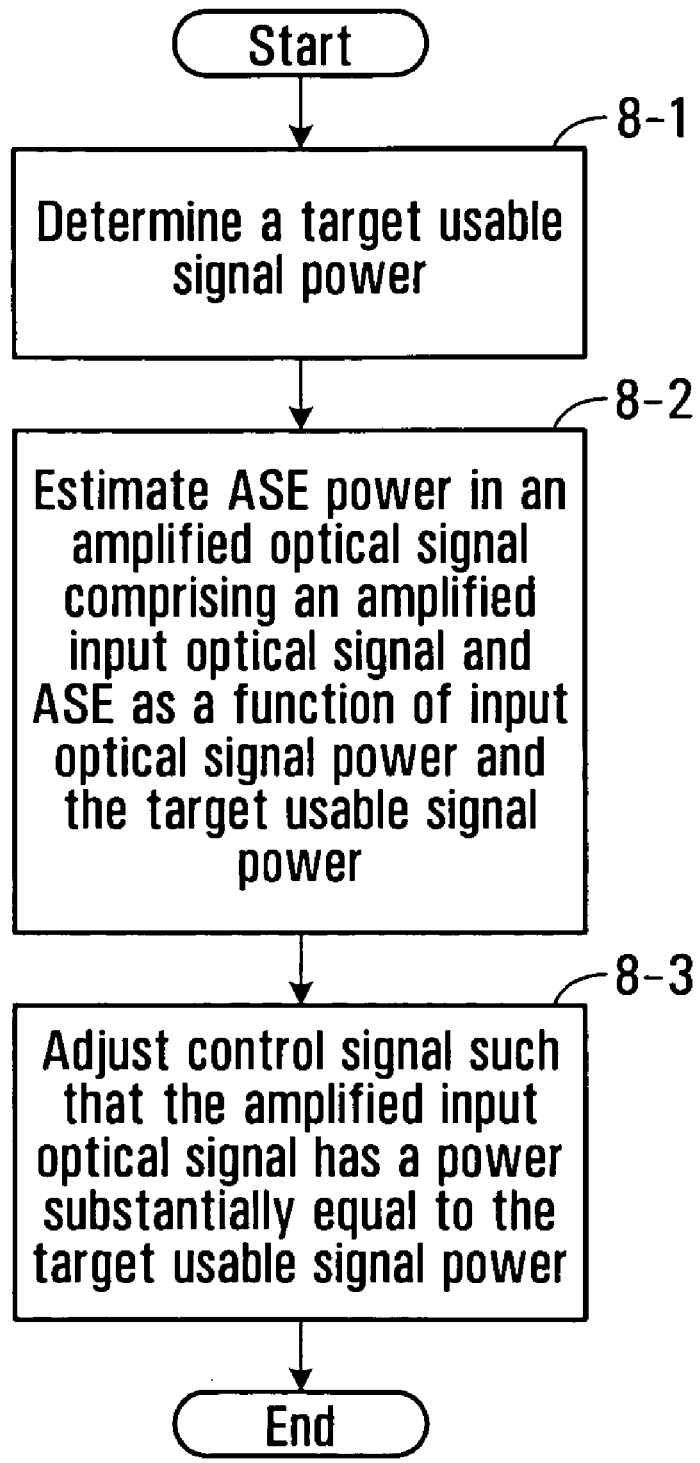
FIG. 8 is a flowchart of an example of control of an optical amplifier according to an embodiment of the invention.

An example of a method for controlling an optical amplifier, which might for example be recorded as statements and instructions for execution by a computer on a computer readable medium and/or implemented as the control logic in the amplification controller 38 shown in FIG. 1, will now be described with reference to FIG. 8. The method begins at step 8-1, in which a target usable signal power is determined. In step 8-2 an estimate of ASE power in an amplified optical signal comprising an amplified input optical signal and ASE is determined as a function of the power of the input optical signal and the target usable signal power. In step 8-3 a control signal is controlled such that the amplified input optical signal has a power substantially equal to the target usable signal power.

An example of a method for ASE compensated ASPC for an optical amplifier will now be described with reference to FIG. 2. The method might for example be implemented in the optical amplifier system 40 shown in FIG. 1. The method begins at step 2-1, in which the input optical signal power of the amplifier system is measured. In step 2-2 a target usable signal power is set. In step 2-3 the input optical signal is amplified by the optical amplifier to produce an amplified input optical signal and ASE. In step 2-4 an estimate of the ASE power in the amplified optical signal is determined based on the target usable signal power. In step 2-5 the amplification of the optical amplifier is controlled such that the amplified input optical signal has a power substantially equal to the target usable signal power.

Figure 2:
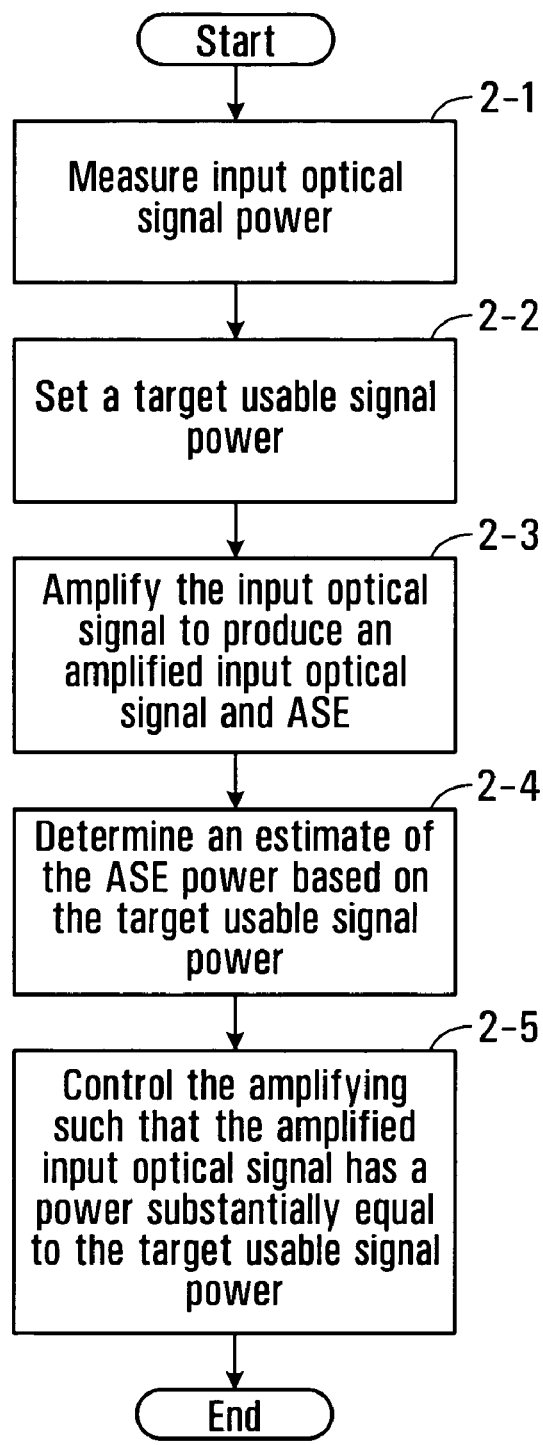
FIG. 2 is a flowchart of an example of a method of automatic signal power control of an optical amplifier according to an embodiment of the invention.

In general, the steps of the method shown in FIG. 2 may be re-ordered or new method steps added such that amplification of an optical amplifier system is automatically controlled to compensate for ASE as a function of the measured input and output optical signal power. For example, to operate an optical amplifier in a constant output signal power mode; the target usable signal power may be specified as a first step of the method. The input signal power may be measured as a second step and the gain of the optical amplifier determined in a third step based on the input signal power and the target usable signal power. The method might then continue with steps 2-3 to 2-5.

In some implementations, the ASE power is calculated as a function of the measured input and output signal power and signal wavelength.

In some implementations the method shown in FIG. 2 might further comprise a calibration step to determine ASE calibration constants.

Specific examples of the method shown in FIG. 2 operable to perform ASE compensated ASPC of specific types of optical amplifiers will now be given.

Static Flat-Gain Optical Amplifier

A static flat-gain optical amplifier has flat gain as a function of wavelength ($\lambda$) only at a designed-flat-gain level. For any other gain level, the Gain-versus-$\lambda$ curve will tilt. In general the flat gain at the designed-flat-gain level is achieved through the use of a GFF. A relationship between ASE power and gain in a static flat-gain EDFA is given by:

$$P_{ASE}(\lambda_s) = (G/G_{flat})^{0.025(\lambda_s - \lambda_c)}[A_1 G^2 + A_2 G + A_3 S_t] \quad (1)$$

where $A_1$, $A_2$ and $A_3$ are ASE calibration constants, $\lambda_c$ is the wavelength at which the EDFA is calibrated; for example, $\lambda_c$ might be 1546 nm for a C-band EDFA, $\lambda_s$ is the signal wavelength, $S_t$ is the target usable signal power, $G_{flat}$ is the flat gain level and G is the gain of the EDFA as a function of $\lambda_s$. The ASE calibration constants for the amplifier must first be determined by carrying out a calibration. In some embodiments, the calibration process comprises setting the gain of the amplifier that is to be calibrated to the flat gain level $G_{flat}$ and measuring the output optical power of the amplifier at a first wavelength $\lambda_s$, such that $\lambda_s$ is equal to $\lambda_c$. Second and third measurements at the first wavelength can be taken for second and third levels of gain and the first, second and third measurements can be used to solve for the three ASE calibration constants $A_1$, $A_2$ and $A_3$ in equation (1) above.

Static Flat-Gain Optical Amplifier: Single-Channel Operation at Constant Output Signal Power Mode An example of a method for ASE compensated ASPC for a flat-gain EDFA in constant output signal power mode will now be described with reference to FIG. 3. The method might for example be implemented in the amplification controller 38 that is part of the optical amplifier system 40. The method begins at step 3-1, in which operating parameters comprising a target usable signal power St and a signal wavelength $\lambda_s$ are provided. In step 3-2 the input signal power $S_{in}$ is dynamically measured. In step 3-3 additional operating parameters comprising the flat gain level $G_{flat}$, the calibration wavelength $\lambda_c$ and the ASE calibration constants $A_1$, $A_2$ and $A_3$ are retrieved. In step 3-4 the desired gain G is calculated from the input signal power Sin and the target usable signal power $S_t$, such that $$G = S_t / S_{in} \quad (2)$$

and then the ASE power $P_{ASE}$ is calculated using equation (1). In step 3-5 the target output power $P_t$, which is the sum of the target usable signal power $S_t$ and the calculated ASE power, is calculated. In step 3-6 the gain of the amplifier is adjusted such that the total output power $P_{out}$ of the amplifier is equal to the target output power $P_t$ and the method returns to step 3-2, which sets up a feedback control loop that maintains the output power $P_{out}$ at the target output power $P_t$; thereby performing ASE compensated ASPC in constant output signal power mode.

Static Flat-Gain Optical Amplifier: Multi-Channel Operation at Constant Output Signal Power Mode In some embodiments, the input signal is a multi-channel signal, with a different wavelength for each channel. In these embodiments, an average of the different wavelengths may be used as the $\lambda_s$ term when calculating the ASE power in step 3-4 of the above-described method. For a multi-channel EDFA, with different wavelength $\lambda$ for each channel, the method shown in FIG. 3 will maintain the composite output signal power of a static-gain EDFA at a constant level. Constant channel signal output power can be achieved by using a dynamic gain EDFA and a method that will be described later.

Static Flat-Gain Optical Amplifier: Single or Multiple Channel Operation at Constant Gain Mode The method shown in FIG. 3 and described above can easily be modified to perform ASE compensated ASPC for a static-gain EDFA in constant gain mode. The only changes that have to be made to the method are rather than providing the target usable signal power $S_t$ in step 3-1, the desired gain G is provided and rather than calculating G in step 3-4, the target usable signal power $S_t$ is calculated from the input signal power $S_{in}$ and the desired gain G, such that $$S_t = GS_{in} \quad (3)$$

The remaining steps of the method remain unchanged.

Single-Channel Optical Amplifier

A single-channel optical amplifier has no gain-flattening filter, so that gain and ASE power are a function of wavelength in any operation case. A relationship between ASE power and gain in a single channel EDFA is $$P_{ASE}(\lambda_s) = (G_R(\lambda_s))^{0.025(\lambda_s - \lambda_c)} [A_1(G_R(\lambda_s))^2 + A_2 G_R(\lambda_s) + A_3 S_t] \quad (4)$$

$$G_R(\lambda_s) = G(\lambda_s)/G_c(\lambda_s) \quad (5)$$

where $A_1$, $A_2$ and $A_3$ are the ASE calibration constants, $\lambda_c$ is the wavelength at which the EDFA is calibrated, for example, $\lambda_c$ might be 1546 nm for a C-band EDFA, $\lambda_s$ is the signal wavelength, $S_t$ is the target output signal power, $G_c(\lambda_s)$ is a gain curve as a function of wavelength measured with the average gain value close to which the EDFA will generally be operated and $G(\lambda_s)$ is the gain of the EDFA as a function of wavelength. The calibration process for the single-channel EDFA is the same as the calibration process described above for the static flat-gain EDFA with the exception of first determining $G_c(\lambda_s)$ by setting the gain level at the calibration wavelength $\lambda_c$ equal to the expected average general operating level and measuring the gain as a function of wavelength.

Single-Channel Optical Amplifier—Constant Output Signal Power Mode

An example of a method for ASE compensated ASPC for a single-channel EDFA will now be described with reference to FIG. 4. The method might for example be implemented in the amplification controller 38 that is part of the optical amplifier system 40. The method begins at step 4-1, in which operating parameters comprising a target usable signal power $S_t$ and a signal wavelength $\lambda_s$ are provided. In step 4-2, the input signal power $S_{in}$ is dynamically measured. In step 4-3 additional operating parameters comprising the calibration gain curve $G_c(\lambda_s)$, the calibration wavelength $\lambda_c$ and the ASE calibration constants $A_1$, $A_2$ and $A_3$ are retrieved. In step 4-4 the desired gain $G(\lambda_s)$ is calculated from the input signal power $S_{in}$ and the target usable signal power $S_t$, such that $$G(\lambda_s) = S_t / S_{in}(\lambda_s) \quad (6)$$

and then the ASE power $P_{ASE}$ is calculated using equations (4) and (5). In step 4-5 the target output power $P_t$, which is the sum of the target usable signal power $S_t$ and the calculated ASE power, is calculated. In step 4-6 the gain of the amplifier is adjusted such that the total output power $P_{out}$ of the amplifier is equal to the target output power $P_t$ and the method returns to step 4-2, which sets up a feedback control loop that maintains the output power $P_{out}$ at the target output power $P_t$; thereby performing ASE compensated ASPC in constant output signal power mode.

Single-Channel Optical Amplifier—Constant Gain Mode

Figure 4:
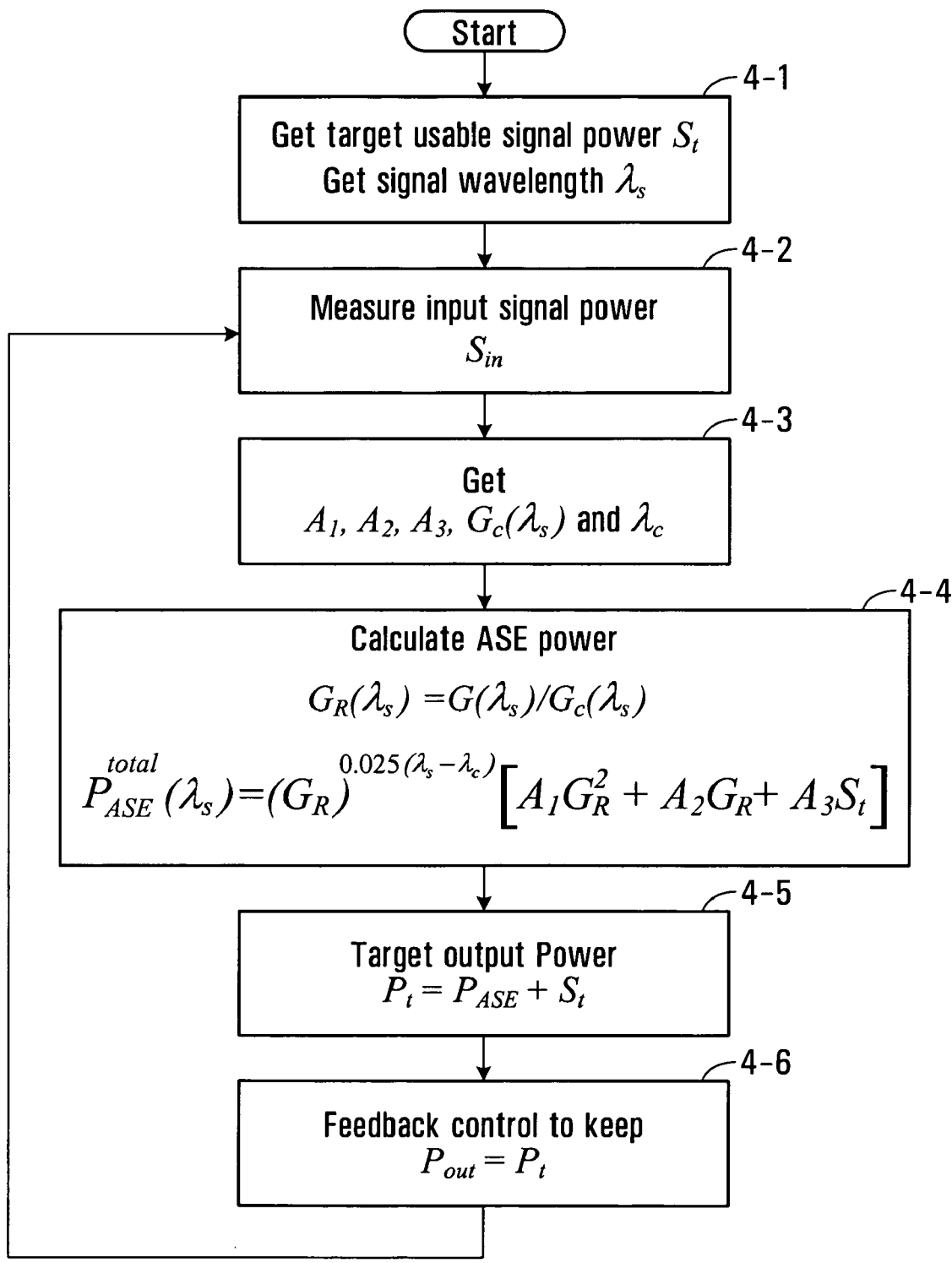
FIG. 4 is a flowchart of an example of a method of automatic signal power control in a single-channel erbium doped fiber amplifier in accordance with an embodiment of the invention.

The method shown in FIG. 4 and described above can easily be modified to perform ASE compensated ASPC for a single-channel EDFA in constant gain mode. The only changes that have to be made to the method are rather than providing the target usable signal power St in step 4-1, the desired gain $G(\lambda_s)$ is provided and rather than calculating $G(\lambda_s)$ in step 4-4, the target usable signal power St is calculated from the input signal power Sin and the desired gain $G(\lambda_s)$, such that $$S_t = G(\lambda_s) S_{in} \quad (7)$$

The remaining steps of the method remain unchanged.

Dynamic Flat-gain Optical Amplifier

In a dynamic flat-gain optical amplifier, the true gain of the amplifying element, such as the true gain of a length of erbium doped fiber, is maintained at a constant level and the effective gain is adjusted with a variable optical attenuator. Because the true gain of the amplifying element is kept constant, gain-tilt does not occur. In this case, the ASE power is independent of signal wavelength and equation (1) simplifies to:

$$P_{ASE} = [A_1 G^2 + A_2 G + A_3 S_t] \quad (8)$$

In the case of a dynamic flat-gain optical amplifier, the ASE calibration constants can be determined by making at least three measurements of the ASE power at different effective gain levels at the same input signal power in order to solve for the three calibration constants $A_1$, $A_2$ and $A_3$.

Dynamic Flat-gain Optical Amplifier—Constant Output Signal Power Mode

An example of a method for ASE compensated ASPC for a dynamic-gain EDFA will now be described with reference to FIG. 5. The method might for example be implemented in the amplification controller 38 that is part of the optical amplifier system 40 if a VOA that was controlled by the amplification controller 38 was included in the signal path between the input and the output of the optical amplifier system 40 and the true gain of the first and second length of optical fiber 24 and 26 was held constant. The method begins at step 5-1, in which operating parameters comprising a target usable signal power $S_t$ and a signal wavelength $\lambda_s$ are provided. At step 5-2, the input signal power $S_{in}$ is dynamically measured. In step 5-3 additional operating parameters comprising the ASE calibration constants $A_1$, $A_2$ and $A_3$ are retrieved. In step 5-4 the desired gain G is calculated from the input signal power Sin and the target usable signal power $S_t$, such that $$G = S_t / S_{in} \quad (9)$$

and then the ASE power $P_{ASE}$ is calculated using equation (8). In step 5-5 the target output power $P_t$, which is the sum of the target usable signal power $S_t$ and the calculated ASE power, is calculated. In step 5-6 the effective gain of the amplifier is adjusted by controlling the attenuation of one or more VOAs such that the total output power $P_{out}$ of the amplifier is equal to the target output power $P_t$ and the method returns to step 5-2, which sets up a feedback control loop that maintains the output power $P_{out}$ at the target output power $P_t$; thereby performing ASE compensated ASPC in constant signal output power mode.

Since the effective gain in a dynamic flat-gain EDFA is flat with respect to wavelength, if the input signal to the amplifier comprises a multi-channel input signal, the ASE compensated ASPC of a dynamic flat-gain EDFA in constant signal output power mode described above will maintain each individual channel at a constant output signal power while maintaining the composite signal power constant.

In some implementations, the signal wavelength $\lambda s$ is not provided in step 5-1, as the ASE power is flat for a dynamic-gain amplifier.

Dynamic Flat-gain Optical Amplifier—Constant Gain Mode

Figure 5:
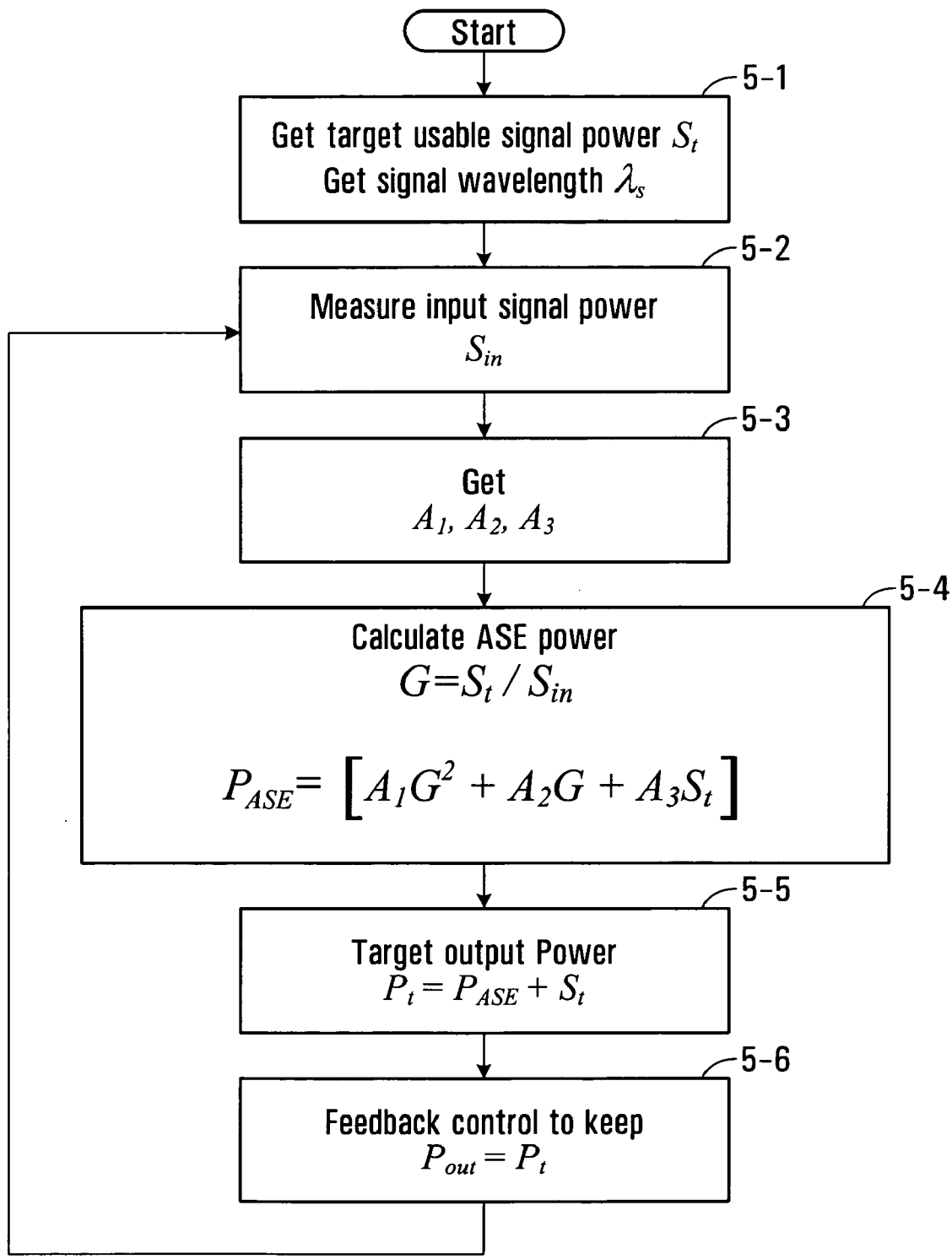
FIG. 5 is a flowchart of an example of a method of automatic signal power control in a dynamic gain-flattened erbium doped fiber amplifier in accordance with an embodiment of the invention.

The method shown in FIG. 5 and described above can easily be modified to perform ASE compensated ASPC for a dynamic-gain EDFA in constant gain mode. The only changes that have to be made to the method are rather than providing the target usable signal power $S_t$ in step 5-1, the desired gain G is provided and rather than calculating G in step 5-4, the target usable signal power $S_t$ is calculated from the input signal power $S_{in}$ and the desired gain G, such that $$S_t = GS_{in} \quad (10)$$

The remaining steps of the method remain unchanged.

Figure 3:
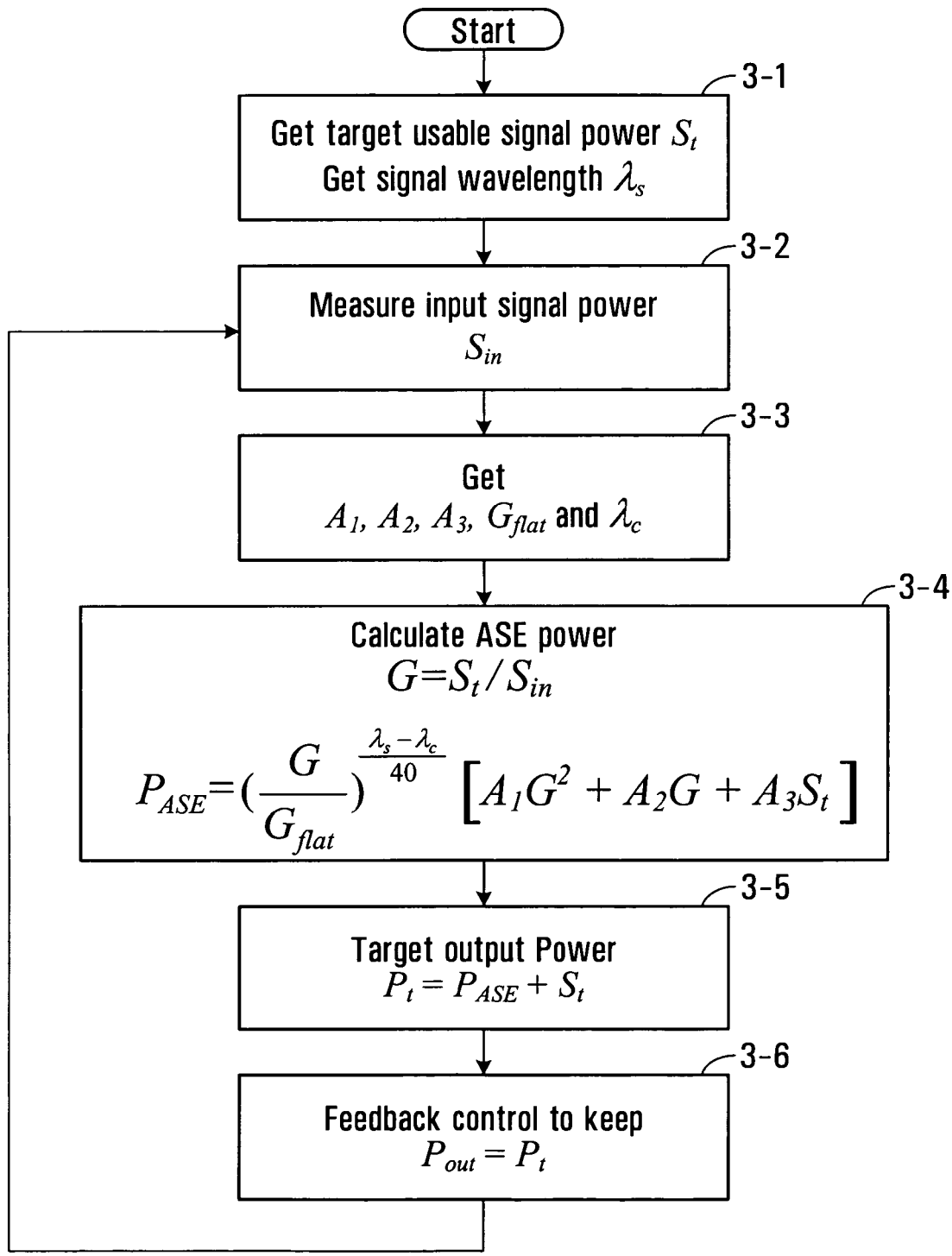
FIG. 3 is a flowchart of an example of a method of automatic signal power control of a static gain-flattened erbium doped fiber amplifier according to an embodiment of the invention.

In some implementations, the methods shown in FIGS. 3, 4 and 5 might be used with optical amplifiers other than an EDFA, for example a semiconductor optical amplifier or other doped fiber amplifiers.

Figure 6:
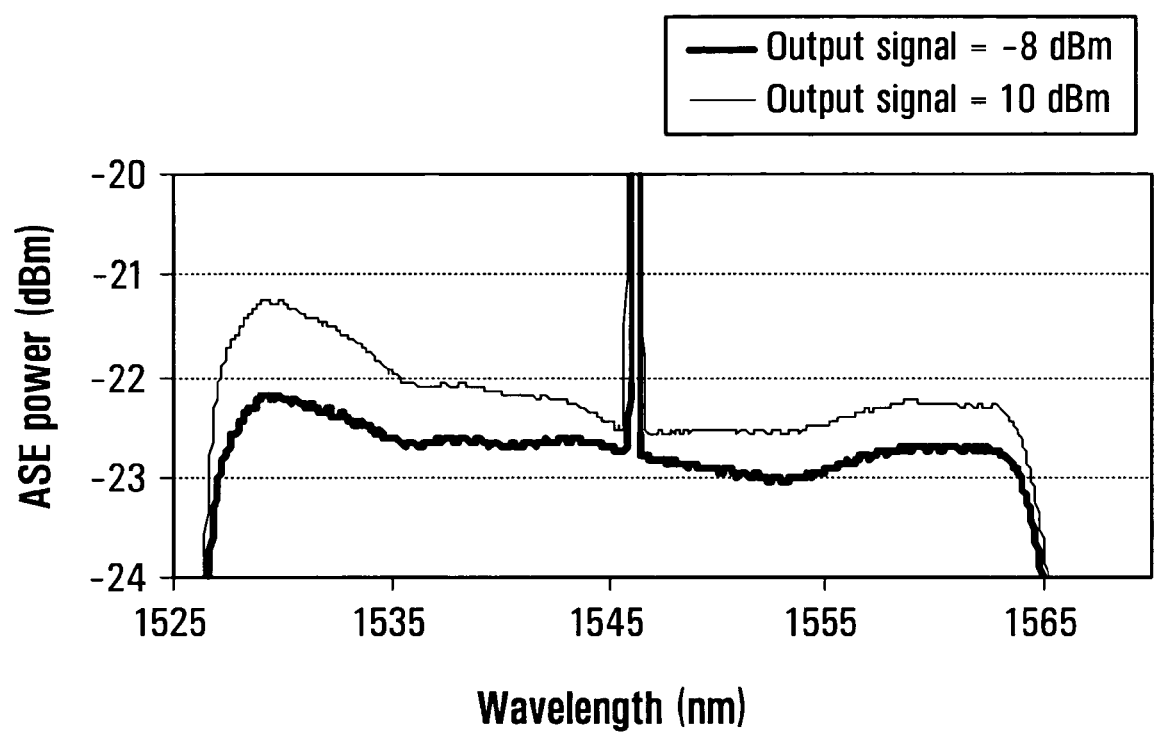
FIG. 6 is a plot of ASE power for two different signal powers, but the same gain level and wavelength, in an erbium doped fiber amplifier.

FIG. 6 shows two curves that represent the measured ASE power of an EDFA at two different output signal powers but with the same gain level. The two curves illustrate that the ASE power is dependent on input signal power. In some embodiments, the dependence of ASE power on signal power can be ignored, which means that the $A_3 S_t$ term in equation (1) can be replaced with a calibration constant $A_3'$, such that $$P_{ASE}(\lambda_s) = (G/G_{flat})0.025(\lambda_s - \lambda_c)[A_1 G^2 + A_2 G + A_3'] \quad (11)$$

In some embodiments, the signal power dependent $A_3 S_t$ term in equations (4) and (8) might also be replaced with the signal power independent term $A_3'$.

While the above examples are directed to ASE compensated automatic signal power control of an optical amplifier, the calculation of ASE power based on a measured input signal power and a target signal power might also be employed in monitoring the noise figure of an optical amplifier. An example of an equation for estimating the noise figure of an optical amplifier as a function of ASE power and gain is as follows:

$$NF = P_{ASE}/(GN_g) \quad (12)$$

where $$G = S_t/S_{in} \quad (13)$$

and NF is the noise figure of an optical amplifier, $P_{ASE}$ is the calculated ASE power, G is the gain of the optical amplifier, $S_t$ is the target usable signal power, $S_{in}$ is the input signal power and $N_g$ is the quantum noise measured in a 0.1 nm resolution bandwidth, which is equal to $16 \times 10^{-10}$ watt. Therefore, determining the ASE power and gain of an optical amplifier according to the methods of the present invention also provides for determining the noise figure of the optical amplifier.

Two specific examples of implementations of the optical amplifier system shown in FIG. 1 will now be given with reference to FIGS. 7A and 7B, in which the optical amplifier 50 is a double-pump EDFA. A double-pump EDFA is a two-stage amplifier in which each stage includes a length of erbium doped fiber that is pumped with pump laser light to provide optical amplification.

Figure 7A:
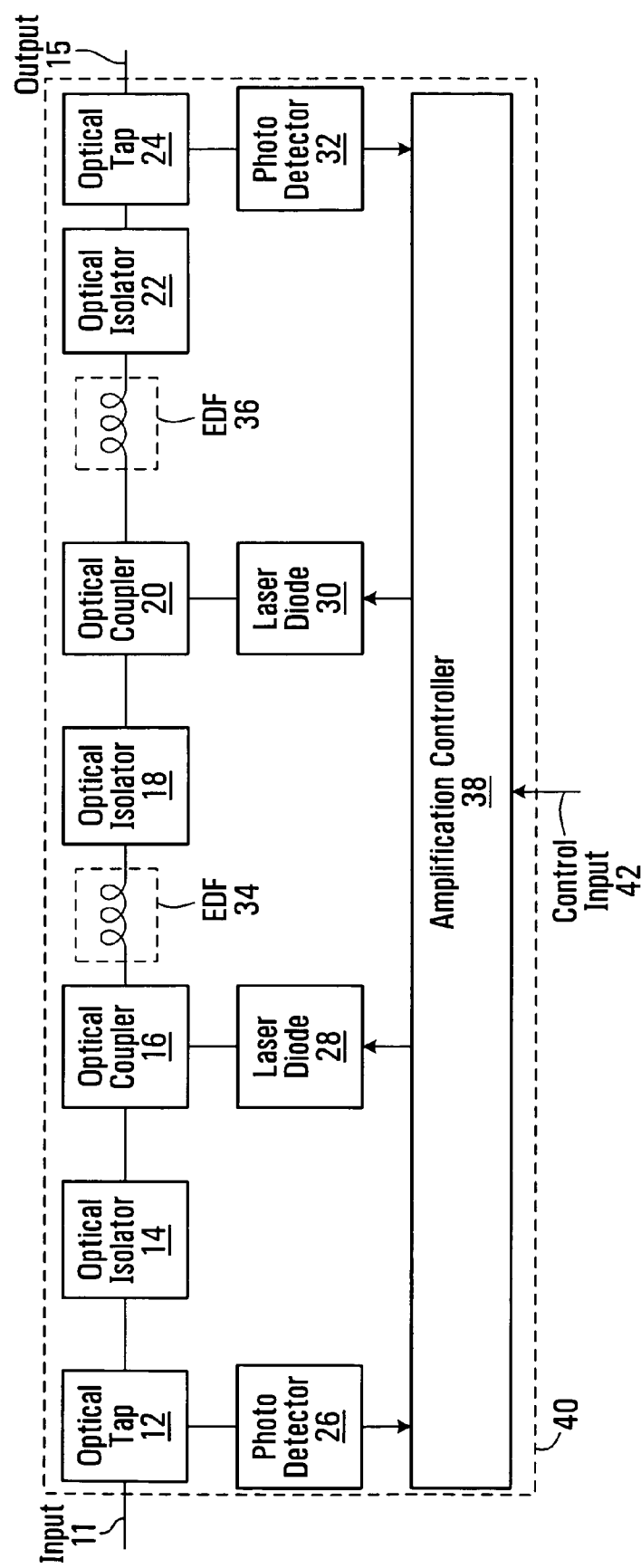
FIG. 7A is a block diagram of an optical amplification system in accordance with an embodiment of the invention.

FIG. 7A is a block diagram of an example of an amplifier system 40 in accordance with an embodiment of the invention in which optical amplification of a double-pump erbium doped fiber amplifier is controlled by an amplification controller 38 that compensates for amplified spontaneous emissions (ASE) while performing automatic signal power control (ASPC). An input 11 of the optical amplifier system 40 is connected to an input of a first optical tap 12. The first optical tap 12 has a first and a second output; the first output is connected to a first optical isolator 14, while the second output is connected to a first photo detector (PD) 26. The first optical isolator 14 has a single output that is connected to a first input of a first optical coupler 16. A second input of the first optical coupler 16 is connected to the output of a first laser diode (LD) 28. The first optical coupler 16 has a single output that is connected to the input of a first length of erbium doped fiber (EDF) 34. The first length of erbium doped fiber 34 has a single output that is connected to the input of a second optical isolator 18. The second optical isolator 18 has a single output that is connected to a first input of a second optical coupler 20. A second input of the optical coupler 20 is connected to the output of a second laser diode 30. The optical coupler 20 has a single output that is connected to the input of a second length of erbium doped fiber 36. The second length of erbium doped fiber 36 is connected to the input of a third optical isolator 22. The third optical isolator 22 has a single output that is connected to the input of a second optical tap 24. The second optical tap 24 has a first and a second output; the first output of the second optical tap 24 is connected to the output 15 of optical amplifier system 40, while the second output of the second optical tap 24 is connected to the input of a second photodetector 32. The outputs of the first and second photodetectors 26 and 32 are functionally connected to first and second inputs of an amplification controller 38. The amplification controller 38 has first and second outputs, which are functionally connected to the inputs of the first and second laser diodes 28 and 30 respectively. The amplification controller 38 also has a control input 42.

In some implementations, one or more wavelength dependent attenuators might be used to maintain a flat gain characteristic with respect to wavelength in the case where the optical amplifier does not have a flat gain characteristic with respect to wavelength. In some implementations, a GFF will only be sufficient to provide flat gain for a specific operating condition, such as a specific gain and/or power level. The location of a GFF in the signal path between the input 11 and the output 15 of the optical amplifier system 40 is an implementation specific detail. For example, in some implementations a wavelength dependent attenuator, such as a gain flattening filter (GFF) might be included between the output of the second optical isolator 18 and the second optical coupler 20 and between the output of the third optical isolator 22 and the second optical tap 24.

In some implementations, one or more of the optical isolators 14, 18 and 22 might not be included.

While the optical amplifier system 40 depicted in FIG. 7A includes two amplifier components, namely the first and second lengths of erbium doped fiber 34 and 36, any number of amplifier components might be included in some implementations.

In some implementations, a single laser source, such as laser diode 28 or 30 might be used as a pump source for one or more doped amplifier fibers, such as the first and second lengths of erbium doped fiber 34 and 36.

In some implementations, the first and second lengths of erbium doped fiber 34 and 36, the first and second optical couplers 16 and 20 and the first and second laser diodes 28 and 30 might be replaced with one or more semiconductor optical amplifiers. In general, any type of optical amplifier might be used.

In operation, an optical signal that is to be amplified is applied to the input 11 of optical amplifier system 40. The first optical tap 12 splits the input optical signal into a first and a second signal and passes the second signal to the first photodetector 26 and passes the first signal to the optical isolator 14, which passes the first signal on to the first optical coupler 16, and isolates the first optical coupler 16 from the first optical tap 12. The first photodetector 26 measures the second signal and transmits the measurement information to the amplification controller 38. The first optical coupler 16 couples the first signal and the pump source laser output from the first laser diode 28, which is controlled by amplification controller 38, and passes the first signal and the pump source laser output from the first laser diode 28 to the first length of erbium doped fiber 34. The first length of erbium doped fiber 34 amplifies the first signal and passes the once amplified first signal to the second optical coupler 20 via the second optical isolator 18, which provides isolation between the second optical coupler 20 and the first length of erbium doped fiber 34. The amplification in the first length of erbium doped fiber 34 causes ASE, which will also be passed to the second optical coupler 20 via the second optical isolator 18. The second optical coupler 20 couples the once amplified first signal, the ASE from the first length of erbium doped fiber 34 and the pump laser output from the second laser diode 30, which is controlled by amplification controller 38, and passes the once amplified first signal, the ASE from the first length of erbium doped fiber 34 and the pump source laser output from the second laser diode 30 to the second length of erbium doped fiber 36. The second length of erbium doped fiber 36 amplifies the once amplified first signal and the ASE from the first length of erbium doped fiber 34 and passes the twice amplified first signal and the once amplified ASE from the first length of erbium doped fiber 34 to the second optical tap 24 via the third optical isolator 22. Like the first length of erbium doped fiber 34, the second length of erbium doped fiber 36 will also contribute ASE. This second ASE will also be passed on to the second optical tap 24 via the third optical isolator 22. The second optical tap 24 receives an input signal, comprising the twice amplified input optical signal, the once amplified ASE from the first length of erbium doped fiber 34 and the second ASE from the second length of erbium doped fiber 36, and splits this input signal into a third and a fourth signal. The second optical tap 24 passes the fourth signal to the second photodetector 32 and the third signal to the output 15 of the amplifier system 40. The second photodetector 32 measures the fourth signal and transmits the measurement information to the amplification controller 38.

The operation of the amplification controller 38 is setup through the control input 42. The amplification controller 38 utilizes the measurement information from the first photodetector 26 and the second photodetector 32 to control the output of the first laser diode 28 and the second laser diode 30. By controlling the output of the first and second laser diodes 28 and 30, the amplification controller 38 can control the gain of the first and second lengths of erbium doped fiber 34 and 36. As stated above, the output of the second length of erbium doped fiber 36, and thus the output 15 of the amplifier system 40, comprises a twice amplified first signal, and an ASE component, comprising the once amplified ASE from the first length of erbium doped fiber 34 and the ASE from the second length of erbium doped fiber 36. Using operating characteristics of double-pump erbium doped fiber amplifier, which can be determined during a calibration, the power of the ASE component of the output can be calculated and the gain of the first and second lengths of erbium doped fiber 34 and 36 can be controlled such that the output signal of the optical amplifier system 40 is maintained at a power level equal to the sum of a target output signal power and the calculated power of the ASE component; thereby carrying out ASE compensated ASPC. In some implementations, the power of the ASE component of the output 15 may be calculated as a function of the gain of the optical amplifier 50, wavelength and input signal power.

In some implementations, one or more variable optical attenuators (VOA) might be included in the signal path between the input 11 and the output 15 of the optical amplifier system 40, such that the effective gain between the input 11 and the output 15 of the optical amplifier system 40 can be adjusted without changing the true gain of the first and second length of erbium doped fiber 34 and 36. In these implementations, the attenuation of the one or more VOAs may be controlled by the amplification controller 38. For example, in some implementations a VOA might be included between the output of the first optical isolator 14 and the input of the first optical coupler 16. One skilled in the art will appreciate that the location of the one or more VOAs in the signal path of the optical amplifier 40 is an implementation specific detail. A specific example is shown in FIG. 7B.

Figure 7B:
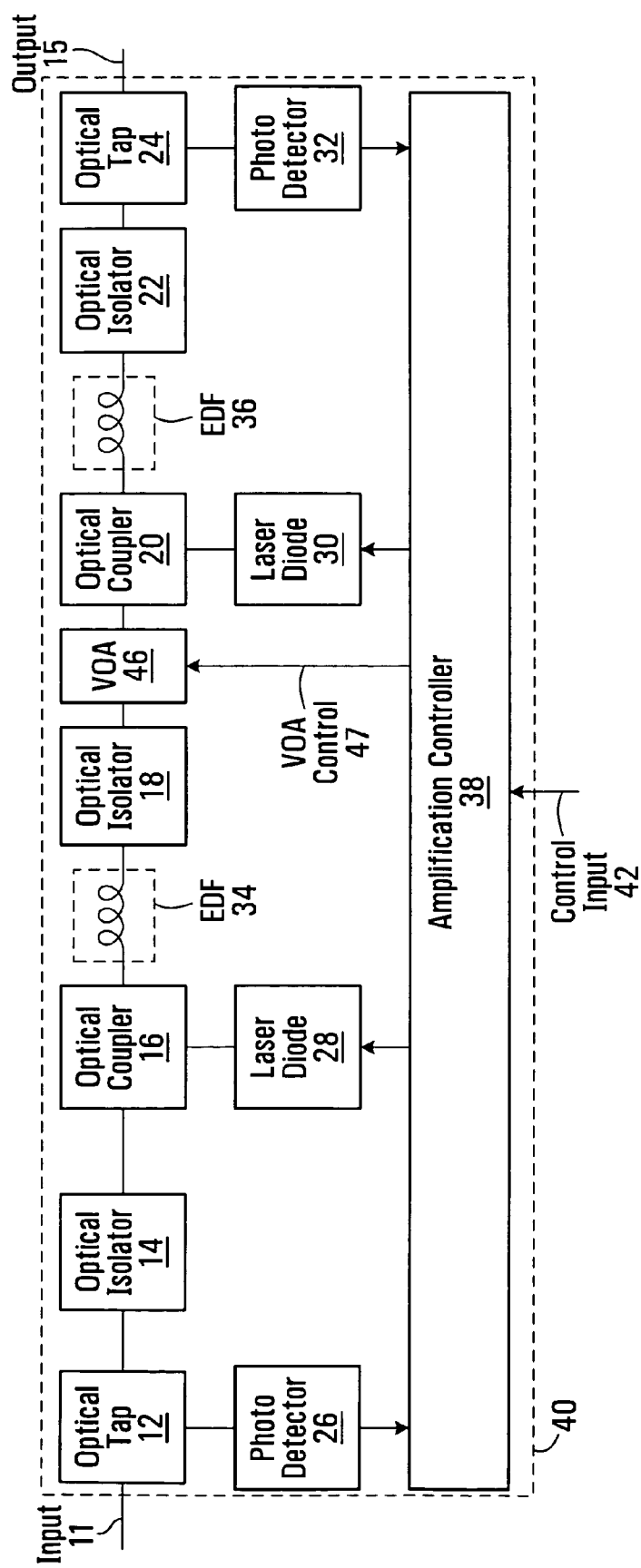
FIG. 7B is a block diagram of an optical amplification system in accordance with an embodiment of the invention.

FIG. 7B is a block diagram of another example of an amplifier system 40 in accordance with an embodiment of the invention in which optical amplification of a double-pump erbium doped fiber amplifier is controlled by an amplification controller 38 that compensates for amplified spontaneous emissions (ASE) while performing automatic signal power control (ASPC). The amplifier system 40 shown in FIG. 7B is the same as the amplifier system 40 shown in FIG. 7A with the addition of a variable optical attenuator 46 between the second optical isolator 18 and the second optical coupler 20. The variable optical attenuator 46 is functionally connected to the amplification controller 38 by VOA control signal 47. The VOA 46 is provided in order to operate the amplifier system as a dynamic gain amplifier. Typically, the EDFAs 34 and 36 are operated at their flat-gain operating point, and the overall effective gain is then adjusted with the VOA 46.

In operation, the optical amplifier system 40 shown in FIG. 7B operates in the same manner as the optical amplifier system 40 shown in FIG. 7A, but rather than adjusting the gain of the optical amplifier system by adjusting the gain of the first and second lengths of erbium doped fiber 34 and 36, as was done in the optical amplifier system 40 shown in FIG. 1, the amplification controller 38 controls the gain of the optical amplifier system 40 shown in FIG. 7B by adjusting the attenuation of the variable optical attenuator 46. Like the laser diodes 28 and 30 of the optical amplifier system 40 shown in FIG. 7A, the laser diodes 28 and 30 of the optical amplifier system 40 shown in FIG. 7B are controlled by the amplification controller 38. Typically, the amplification controller 38 will adjust the pump power put out by the laser diodes 28 and 30 as the input power of the amplifier system changes in order to maintain the true gain of the EDFAs 34 and 36 at a constant level.

In some implementations, the control signals of laser diodes acting as pump sources for EDFAs are held at a constant level or controlled by a controller other than the amplification controller 38.

The location of a variable optical attenuator in the signal path between the input 11 and the output 15 of the optical amplifier system 40 is an implementation specific detail.

In some implementations, the signal path includes more than one variable optical attenuator.

In some implementations, the signal path includes one or more gain flattening filters.

In FIGS. 7A and 7B, the first laser diode 28 is used to provide pump laser light to the first EDF 34 while the second laser diode 30 is used to provide pump laser light to the second EDF 36. However, in some implementations, a single laser diode is used to provide pump laser light to the first EDF 34 and the second EDF 36. For example, in some implementations the first laser diode 28 and the second laser diode 30 are replaced with a single laser diode and a power splitter, which power splitter splits the output of the single laser diode to the second input of the first optical coupler 16 and the second input of the second optical coupler 20. Alternatively, in some implementations, a single laser diode is used to provide pump laser light to the first EDF 34 and the left over pump laser light from the first EDF 34 is used to pump the second EDF 36. For example, in some implementations, the second optical coupler 20 is not included in the optical amplifier and the first laser diode 28 and the second laser diode 30 are replaced with a single laser diode which provides pump laser light to the second input of the optical coupler 16. The pump laser light from the single laser diode pumps the first EDF 34 and the left over pump laser light then pumps the second EDF 36.

More generally, any type of optical amplifier and any mechanism for adjusting the amplification of the optical amplifier may be used.

What has been described is merely illustrative of the application of the principles of the invention. Other arrangements and methods can be implemented by those skilled in the art without departing from the spirit and scope of the present invention.

The invention claimed is:

1. A method comprising:
   measuring power of an input optical signal;
   determining a target usable signal power;
   amplifying the input optical signal to produce an amplified optical signal comprising an amplified input optical signal and amplified spontaneous emission (ASE);
   determining an estimate of the ASE power in the amplified optical signal as a non-linear function of gain; and
   controlling the amplifying such that the amplified input optical signal has a power substantially equal to the target usable signal power.

2. The method according to claim 1, wherein determining the estimate of the ASE power as a non-linear function of gain comprises determining the estimate of the ASE power as a function of the power of the input optical signal and the target usable signal power.

3. The method according to claim 2, further comprising determining the estimate of the ASE power as a function of the power of the input optical signal, the target usable signal power and a signal wavelength.

4. The method according to claim 3, wherein the input optical signal comprises a multi-channel optical signal comprising optical signals at a plurality of wavelengths, and wherein the signal wavelength is an average of the plurality of wavelengths.

5. The method of claim 1, wherein determining the target usable signal power comprises any one of:
   providing the target usable signal power as a constant; and
   providing a desired gain and calculating the target usable signal power according to:
   the target usable signal power=(the desired gain)*(the power of the input optical signal).

6. The method of claim 1 further comprising calibrating to determine one or more calibration constants, wherein determining the estimate of the ASE power as a non-linear function of gain comprises determining the estimate of the ASE power as a function of the power of the input optical signal and the target usable signal power using the ASE calibration constants.

7. The method according to claim 1, wherein controlling the amplifying comprises any one of controlling a true gain of an amplifier and controlling an attenuation of an attenuator.

8. The method according to claim 7 further comprising:
   measuring power of the amplified optical signal; and controlling the amplifying as a function of the power of the input optical signal and the power of the amplified optical signal.

9. The method according to claim 1, further comprising determining a signal wavelength, a calibration wavelength and ASE calibration constants, wherein:
   amplifying the input optical signal comprises amplifying the input optical signal with a static flat-gain erbium doped fiber amplifier with a substantially flat gain at a designed-flat-gain level using at least one gain flattening filter (GFF); and
   determining the estimate of the ASE power as a non-linear function of gain comprises calculating the estimate of the ASE power according to:

$$G = S_t/S_{in};$$

and $$P_{ASE}(\lambda_s) = (G/G_{flat})^{0.025(\lambda_s - \lambda_c)} [A_1 G^2 + A_2 G + A_3 S_1];$$

wherein: G is a desired gain; $S_{in}$ is the measured power of the input optical signal; $S_t$ is the target usable signal power; $\lambda_s$ is the signal wavelength; $G_{flat}$ is the designed-flat-gain level; $\lambda_c$ is the calibration wavelength; and $A_1$, $A_2$ and $A_3$ are the ASE calibration constants.

10. The method according to claim 1, further comprising determining a signal wavelength, a calibration wavelength, a calibration gain level and ASE calibration constants; wherein:
   amplifying the input optical signal comprises amplifying the input optical signal with a single-channel erbium doped fiber amplifier; and
   determining the estimate of the ASE power as a non-linear function of gain comprises calculating the estimate of the ASE power according to:

$$G(\lambda_s) = S_t/S_{in}(\lambda_s);$$

$$G_R(\lambda_s) = G(\lambda_s)/G_c(\lambda_s);$$

and $$P_{ASE}(\lambda_s) = (G_R(\lambda_s))^{0.025(\lambda_s - \lambda_c)} [A_1 (G_R(\lambda_s))^2 + A_2 G_R(\lambda_s) + A_3 S_t];$$

wherein: $G(\lambda_s)$ is a desired gain; $S_t$ is the target usable signal power; $S_{in}$ is the measured power of the input optical signal at $\lambda_R$; $\lambda_s$ is the signal wavelength; $G_c(\lambda_s)$ is the calibration gain level; $\lambda_c$ is the calibration wavelength; and $A_1$, $A_2$ and $A_3$ are the ASE calibration constants.

11. The method according to claim 1, further comprising:
determining a signal wavelength, a calibration wavelength, a calibration gain level and ASE calibration constants; wherein:
amplifying the input optical signal comprises amplifying the input optical signal with a dynamic flat-gain erbium doped fiber amplifier with at least one variable optical attenuator (VOA) and at least one GFF; and
determining the estimate of the ASE power as a non-linear function of gain comprises calculating the estimate of the ASE power according to:

$$G = S_t/S_{in};$$

and $$P_{ASE} = [A_1 G^2 + A_2 G + A_3 S_t];$$

wherein: G is a desired gain; $S_t$ is the target usable signal power; $S_{in}$ is the power of the input optical signal; and $A_1$, $A_2$ and $A_3$ are the ASE calibration constants.

12. The method according to claim 1 further comprising determining an estimated noise figure as a function of the ASE power, the measured power of the input optical signal and the target usable signal power.

13. The method according to claim 12 wherein determining the estimated noise figure comprises calculating the estimated noise figure according to:

$$G = S_t/S_{in};$$

and $$NF = P_{ASE}/(GN_g);$$

wherein: NF is the estimated noise figure; $P_{ASE}$ is the ASE power; G is gain; $S_t$ is the target usable signal power; $S_{in}$ is the measured power of the input optical signal; and $N_g$ is quantum noise measured in a 0.1 nm resolution bandwidth, which is equal to $16 \times 10^{-10}$ watt.

14. An optical amplifier system with an optical input, an optical output and a control input, comprising:
an optical amplifier in a signal path between the optical input and the optical output, operable to amplify an input optical signal to produce an amplified optical signal comprising an amplified input optical signal and amplified spontaneous emission (ASE);
a first photodetector operable to measure power of the input optical signal at the optical input;
a second photodetector operable to measure power of the amplified optical signal at the optical output;
an amplification controller functionally connected to the optical amplifier, the control input and the first and second photodetectors, operable to:
determine a target usable signal power;
determine an estimate of ASE power in the amplified optical signal as a non-linear function of gain of the optical amplifier; and
control the optical amplifier such that the amplified input optical signal has a power substantially equal to the target usable signal power.

15. The optical amplifier system according to claim 14 wherein the optical amplifier comprises at least one of an erbium doped fiber amplifier and a semiconductor optical amplifier.

16. The optical amplifier system according to claim 14 further comprising the amplification controller operable to carry out a calibration process to determine at least one ASE calibration constant.

17. The optical amplifier system according to claim 15, wherein the optical amplifier further comprises at least one variable optical attenuator, wherein the amplification controller is further operable to control the optical amplifier by controlling the at least one variable optical attenuator.

18. The optical amplifier system according to claim 17, wherein the optical amplifier further comprises at least one gain flattening filter.

19. A method for controlling an optical amplifier comprising:
determining target usable signal power;
estimating ASE power in an amplified optical signal comprising an amplified input optical signal and ASE as a non-linear function of an input optical signal power and the target usable signal power; and
controlling at least one control signal such that the amplified input optical signal has a power substantially equal to the target usable signal power.

20. A computer readable medium having recorded thereon statements and instructions for execution by a computer to carry out the method of claim 19.

21. A controller comprising:
a first input operable to receive a measurement of power of an input optical signal of at least one optical amplifier operable to amplify the input optical signal to produce an amplified optical signal comprising an amplified input optical signal and amplified spontaneous emission (ASE);
a second input operable to receive a measurement of power of the amplified optical signal of the at least one optical amplifier;
control logic operable to:
determine a target usable signal power;
determine an estimate of ASE power in the amplified optical signal as a non-linear function of gain of the at least one optical amplifier; and
provide at least one control signal operable to adjust the gain of the at least one optical amplifier such that the amplified input optical signal has a power substantially equal to the target usable signal power; and
at least one control signal output operable to output the at least one control signal.

22. The controller according to claim 21, wherein the controller comprises any one of an application specific integrated circuit, a field programmable gate array and a programmable logic device.

* * * * *